Oct. 13, 1942.   G. E. NERNEY   2,298,502
EYEGLASS CONSTRUCTION
Original Filed March 17, 1939
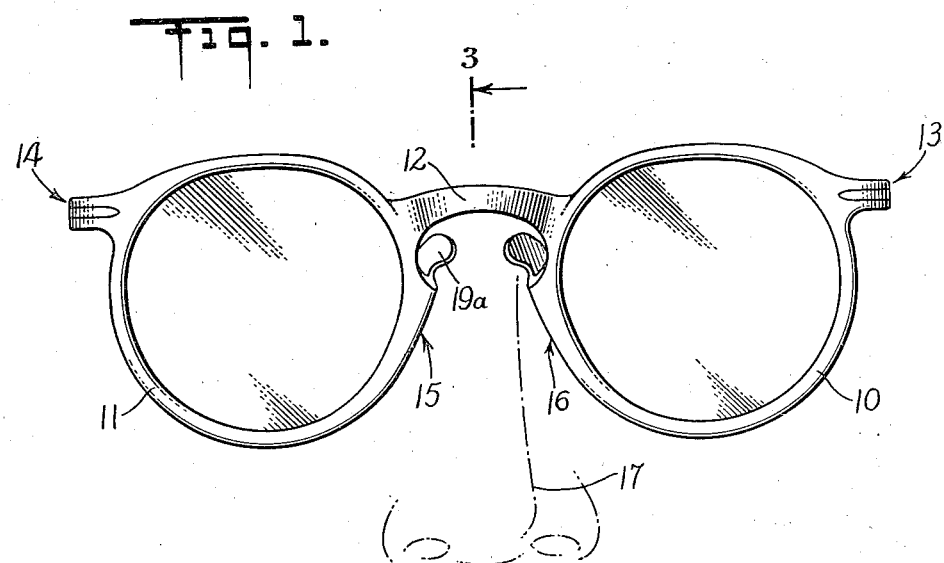
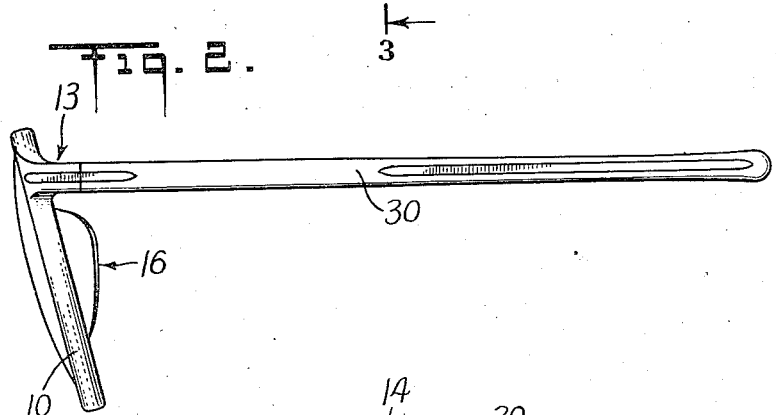
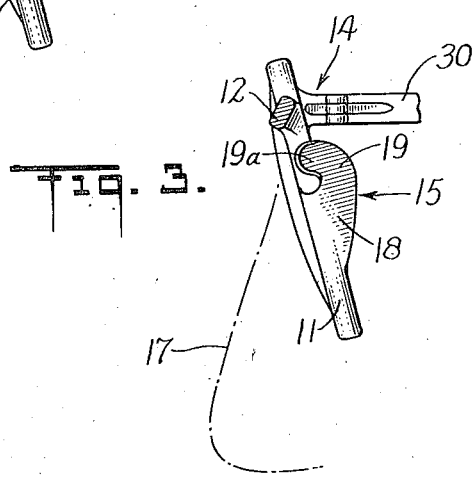
INVENTOR
George E. Nerney
BY
Blair, Curtis & Hayward
ATTORNEYS Patented Oct. 13, 1942

2,298,502

UNITED STATES PATENT OFFICE 2,298,502

EYEGLASS CONSTRUCTION

George E. Nerney, Attleboro, Mass., assignor to Bay State Optical Company, Attleboro, Mass., a corporation of Maine Original application March 17, 1939, Serial No. 262,341. Divided and this application April 4, 1941, Serial No. 386,803

3 Claims. (Cl. 88—48)

This invention relates to an eyeglass construction and more particularly to an eyeglass frame formed from plastic material or the like.

One of the objects of this invention is to provide an eyeglass construction which will be neat and attractive in appearance. Another object is to provide a construction of the above character which will be simple, practical and thoroughly durable. Another object is to provide a construction of the above character which materially increases the comfort of the wearer. Another object is to provide a construction of the above character which will firmly hold its position on the face of the wearer without causing undue discomfort. Other objects will be in part obvious and in part pointed out hereinafter.

The invention accordingly consists in the features of construction, combinations of elements, and arrangements of parts, all as will be illustratively described herein, and the scope of the application of which will be indicated in the following claims.

In the accompanying drawing in which is shown one of the possible embodiments of this invention;

Figure 1 is a front elevation of an eyeglass frame as mounted upon the nose of the wearer and having the features of my invention embodied therein;

Figure 2 is a side elevational view of the frame shown in Figure 1; and,

Figure 3 is a fragmentary side elevation of a portion of the frame shown in Figure 1 as mounted on the nose of the wearer.

Similar reference characters refer to similar parts throughout the several views of the drawing.

The present application is a division of my co-pending application, filed March 17, 1939, Serial No. 262,341, for Eyeglass construction and method of making the same.

As conducive to a clearer understanding of certain features of this invention, it might here be pointed out that in some eyeglass frames and particularly those formed from a plastic material such as zylonite or the like the usual nose guard portions engage the nose at points below the upper portions of the eye sockets. Thus, these frames are harder to fit comfortably against the nose due to the fact that the frame cannot be adjusted materially without throwing the lenses off center with respect to the eyes. Furthermore, this position of the nose guard is apt to be uncomfortable. One of the objects of this invention is to provide a construction wherein the above difficulties as well as many others are successfully overcome.

It might here be noted that reference hereinafter to an "outward" direction signifies a direction to the left or right of the bridge of an eyeglass frame in the direction of the temples, while the term "inward" denotes a direction opposite thereto. A "rearward" direction refers to a direction toward the face of the wearer, whereas the term "forward" denotes the opposite direction. An "upward" direction refers to a direction upwardly from the face of the wearer, while a "downward" direction is opposite thereto.

Referring now to Figure 1, there is shown an eyeglass frame preferably formed from zylonite or the like and having rims 10 and 11 connected by a bridge portion 12. Rims 10 and 11 are enlarged to form endpiece portions generally indicated at 13 and 14, to which temples 30 are hingedly connected.

Beneath bridge 12 rims 10 and 11 are enlarged radially to form nose guard portions generally indicated at 15 and 16. These nose guard portions are substantially similar in shape and construction and accordingly only nose guard portion 15 will be described in detail.

As best shown in Figure 1, nose guard portion 15 curves gradually in an outward direction from the normal periphery of rim 10 so that it may rest upon the side portion of the nose of the wearer indicated at 17. As best seen in Figure 3, an extension 18 of nose guard 15 extends angularly and rearwardly with respect to the normal plane of rim 11 and preferably curves inwardly toward the lens so that it fits against the sloping side of the nose. Thus the rear edges of the nose pads are spaced more widely than the forward edges thereof. Furthermore, a lobe 19 extends upwardly toward bridge 12. Lobe 19 is preferably spaced to the rear of rim 11 or immediately above extension 18 and preferably terminates in a forwardly extending portion 19a substantially adjacent the forward edge of rim 11 and thus immediately below bridge 12.

As best seen in Figure 1, lobe 19 extends inwardly toward the center line of bridge 12 and nose 17 thus to fit against the side of the nose immediately adjacent the upper portion of the eye socket. Accordingly, nose guard 15 with extension 18 and lobe 19 engage a substantial portion of the side of the nose. Lobe 19, nose guard 15 and extension 18 thus distribute the weight evenly along a substantial portion of the nose.

Furthermore, lobe 19 may be easily adjusted to a suitable comfortable position which will hold the frame stable against the face of the wearer without discomfort. Because zylonite is a particularly pliable material when heated, lobe 19 and extension 18 may be bent in any desired direction with ease thus to conform to the wearer's individual shape characteristics.

As is well known, non-metallic frames have a tendency to slide downwardly on the nose of the wearer especially in warm weather when the sides of the nose are wet by perspiration. This leads to inconvenience to the wearer in that the lenses move out of their adjusted position, and accordingly the wearer must continually reposition the frame on his nose. The forwardly extending portions of the nose guards such as lobe 19a are of particular importance in that they prevent this sliding movement. They accomplish this by permitting the nose guard to be adjusted to fit the center ridge portion of the nose as well as the sides thereof. Because of the formation of this portion of the nose, the forwardly extending portions coact with it to hold the frame in its proper position. These portions also add to the comfort of the wearer by dividing the weight of the frame between two different portions of the nose.

It will thus be seen that I have provided a thoroughly practical and efficient construction in which the several objects hereinabove referred to as well as many others have been successfully accomplished.

As many possible embodiments may be made of the above invention and as many changes might be made in the embodiment above set forth, it is to be understood that all matter hereinabove set forth, or shown in the accompanying drawing is to be interpreted as illustrative and not in a limiting sense.

I claim:

1. In eyeglass frame construction, in combination, an eyeglass frame formed from a plastic material, a pair of nose guards formed on and integral with said frame, said nose guards including sections which slant downwardly and outwardly and are adapted to engage the sides of the nose of a wearer, said sections being connected to said rims substantially throughout their vertical lengths, a pair of lobes of substantial size with respect to said nose guards formed on the upper ends of said nose guards and extending upwardly therefrom, and a pair of forwardly extending portions formed on and extending forwardly from said lobes, said forwardly extending portions having planar surfaces of substantial size adapted to engage portions of the center ridge section of the nose of the wearer, said forwardly extending portions being adjustable with relation to the downwardly and outwardly slanting sections of said nose guards so that said forwardly extending portions may be fitted to engage portions of the center ridge section of the nose of the wearer.

2. In eyeglass construction, in combination, an eyeglass frame formed from a plastic material, a pair of nose guards formed on and integral with said frame, said nose guards including sections extending rearwardly from the plane of said frame and connected throughout their vertical lengths to the rims of said frame, a pair of lobes extending upwardly from said rearwardly extending sections, and a pair of forwardly extending portions extending forwardly from said lobes, said last-mentioned portions extending into the plane in which said frame lies and being adjustable with relation to said rearwardly and upwardly extending portions, said forwardly extending portions being adjustable with relation to the rearwardly extending sections of said nose guards so that said forwardly extending portions may be fitted to engage portions of the center ridge section of the nose of the wearer.

3. In eyeglass frame construction, in combination, an eyeglass frame formed from a plastic material, a pair of nose guards formed on and integral with said frame, said nose guards including a pair of sections extending rearwardly from said frame, said rearwardly extending sections slanting downwardly and outwardly with respect to said frame, a pair of lobes extending upwardly from the upper ends of said rearwardly extending sections, the forward edges of said lobes being positioned substantially in a plane passing through the rear surfaces of said frame, and a pair of forwardly extending portions extending forwardly from the forward edges of said lobes, said forwardly extending portions extending forwardly substantially the width of said frame and having planar surfaces of substantial size with respect to said nose guards adapted to engage portions of the center ridge section of the nose of the wearer, said forwardly extending portions being adjustable with relation to the rearwardly extending sections of said nose guards so that said forwardly extending portions may be fitted to engage portions of the center ridge section of the nose of the wearer.

GEORGE E. NERNEY.